(12) United States Patent
Rome

(10) Patent No.: US 9,315,351 B2
(45) Date of Patent: *Apr. 19, 2016

(54) COMPONENT CARRIER REEL SPLICING TAPE

(71) Applicant: ElectroReel Components, LLC, El Paso, TX (US)

(72) Inventor: Patrick Rome, El Paso, TX (US)

(73) Assignee: ElectroReel Components, LLC, El Paso, TX (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/255,160

(22) Filed: Apr. 17, 2014

(65) Prior Publication Data

US 2014/0220285 A1 Aug. 7, 2014

Related U.S. Application Data

(63) Continuation-in-part of application No. 13/012,863, filed on Jan. 25, 2011, now Pat. No. 9,181,459.

(60) Provisional application No. 61/383,616, filed on Sep. 16, 2010, provisional application No. 61/813,009, filed on Apr. 18, 2013.

(51) Int. Cl.
  *C09J 7/02* (2006.01)
  *B65H 21/00* (2006.01)

(52) U.S. Cl.
  CPC ............... *B65H 21/00* (2013.01); *C09J 7/0232* (2013.01); *C09J 7/0264* (2013.01); *B65H 2301/46314* (2013.01); *B65H 2407/20* (2013.01); *B65H 2511/512* (2013.01); *C09J 2201/20* (2013.01); *C09J 2203/342* (2013.01);

(Continued)

(58) Field of Classification Search
  CPC .. C09J 7/0232; C09J 7/0264; C09J 2203/342; C09J 2201/02; Y10T 29/49817; Y10T 428/14; Y10T 428/149
  See application file for complete search history.

(56) References Cited

U.S. PATENT DOCUMENTS

| 2,964,587 A | 11/1956 | Minot |
| 3,424,644 A | 1/1969 | Nakagome |
| 4,247,582 A | 1/1981 | Hanke |

(Continued)

FOREIGN PATENT DOCUMENTS

| JP | 2003-246510 A | 9/2003 |
| JP | 2010-189008 A | 9/2010 |

*Primary Examiner* — Patricia L Nordmeyer
(74) *Attorney, Agent, or Firm* — Kevin Soules; Luis M. Ortiz; Kermit D. Lopez

(57) ABSTRACT

A splicing tape for accurately aligning and joining spliced component carrier reels is disclosed. The flexible splice tape allows the components to remain aligned and picked from a component carrier reel without interruption at the union of a first and second reel. The splice tape with an optional stiffening strip provides a flexible, yet strong connection to prevent back and forth, axial and lateral movement between spliced reels. The detection of the disclosed splice tape facilitates elimination of incorrect and mismatched components during splicing. The splice tape comprises a plastic-type material coated on one side with a pressure-sensitive adhesive composition. A protective paper covers the adhesive composition. The splice tape and protective paper are divided into sections using a staggered slit arrangement. The staggered slit arrangement aids in proper alignment and adhesion of the splice tape to component carrier reels.

17 Claims, 20 Drawing Sheets

(52) U.S. Cl.
CPC ......... *C09J 2467/006* (2013.01); *Y10T 428/14* (2015.01); *Y10T 428/1471* (2015.01)

(56) References Cited

U.S. PATENT DOCUMENTS

| | | |
|---|---|---|
| 4,446,183 A | 5/1984 | Savagian |
| 5,643,401 A | 7/1997 | Schulze-Kahlayss et al. |
| 5,692,699 A | 12/1997 | Weirauch et al. |
| 5,916,651 A | 6/1999 | Wienberg et al. |
| 5,996,927 A | 12/1999 | Weirauch et al. |
| 6,428,888 B1 | 8/2002 | Kato |
| 6,649,239 B2 | 11/2003 | Donahue |
| RE38,356 E | 12/2003 | Weirauch et al. |
| 6,916,394 B2 | 7/2005 | Sumida et al. |
| 7,152,825 B2 | 12/2006 | Nootbaar |
| 7,476,429 B2 | 1/2009 | Bean et al. |
| 8,173,252 B2 | 5/2012 | Ellringmann et al. |
| 2002/0056784 A1 | 5/2002 | Davies et al. |
| 2004/0045658 A1 | 3/2004 | Bean et al. |
| 2008/0087370 A1 | 4/2008 | Manteufel |

COMPONENT CARRIER REEL SPLICING TAPE

CROSS REFERENCE TO RELATED APPLICATIONS

This patent application is a Continuation-in-Part of U.S. Non-Provisional patent application Ser. No. 13/012,863, filed on Jan. 25, 2011, and entitled "COMPONENT CARRIER REEL SPLICING TAPE, which claims the priority and benefit under 35 U.S.C. §119(e) of U.S. Provisional Patent Application Ser. No. 61/383,616, filed on Sep. 16, 2010, entitled "System and Method for Accurately Aligning Splicing Reels Using Antistatic Splicing Tape." This patent application also claims the priority and benefit under 35 U.S.C. §119(e) of U.S. Provisional Patent Application Ser. No. 61/813,009, filed Apr. 18, 2013, entitled "COMPONENT CARRIER REEL SPLICING TAPE," all of which are incorporated herein by reference in their entirety.

FIELD OF THE INVENTION

The disclosed embodiments relate to components and component carrier reels. The disclosed embodiments further relate to techniques for accurately splicing, aligning, and connecting component carrier reels. The disclosed embodiments also relate to accurate component placement from the properly spliced component carrier reds into various devices.

BACKGROUND

As miniaturization of components and circuit boards advance, smaller components require precise reel-to-reel interface in order to avoid costly integration problems. A missing, wrong, or misplaced component occurring at a reel changeover connection could result in loss of an entire run of finished circuit boards, or other assembled products. A significant and expensive product loss, however, may result following a splicing error. Product loss entails a difficult re-work of devices, scrap of the circuit board assembly, for example, or even more catastrophic, a product failure in the field.

Proposed solutions include using some form of alignment tool on the alignment or splice tape, such as box-like teeth of a certain length and width, holes for receiving sprockets or knobs, color-coding spliced motion picture film. These methods are problematic because alignment tools incorporated on tape itself makes it difficult to accurately align spliced reels in an efficient manner. Production in manufacturing lines often interrupts when alignment errors in reel splicing occur. Further, previous proposed solutions do not maintain a strong, yet flexible joint when feeding the component carrier reels through machines for insertion of mechanical or electrical components. The static shock-inducing plastic carrier of previous designs is further problematic in previous splicing tapes. Universal use of a single splice tape design could apply to numerous sizes, shapes, and widths of component carrier reels.

Therefore, a need exists for a method to error proof reel splicing to prevent costly interruptions of manufacturing lines. Using an improved, cost-efficient splice tape to accurately align and connect component carrier reels will result in accurate component placement into various devices from properly aligned component carrier reels.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore an object of the disclosed embodiments to enhance splice tape reliability by reducing improper placement of components that may shift pick location near a reel splice interconnection.

It is another object of the disclosed embodiments to eliminate or reduce waste sections of static shock-inducing alignment and handling portions of splice designs, and the disposal of such waste at the point of use, while maintaining ease of use with a single placement of splice tape to achieve full assembly of spliced reels.

It is an object of the disclosed embodiments to provide a means of detecting the joint between the first and second spliced reels through visual blocking of the component's reel feeder holes, or use of inductive sensible materials incorporated in the splice.

The above and other aspects can be achieved as is now described. The embodiments further comprise an adhesive-coated film with protective liner with two or more adhesive-coated film sections to splice the top and bottom side of the union of a new and finishing roll of material. The adhesive coated film and protective paper are cut to create foldable detachable section of adhesive film and protective paper between the two splicing sections. The detachable section facilitates handling and precise alignment and placement of the adhesive film splice sections. The splice tape connects two rolls of material, both top and bottom, where one joint securely splices the main web of material and the other section splices an offset cover film. Then other section covers component pockets with components on the opposing side of the web of material. The detachable foldable section is removed after splicing and disposed of after application of the adhesive film splices to the joint between the newly spliced rolls.

The embodiments further comprise numerous staggered slits and perforations of the adhesive coated film and the protective liner. The staggered slit arrangement facilitates precise alignment of splices component carrier reel tapes. Alignment using the slits as described herein achieves precise alignment of the finishing and newly spliced roll of material, with an adhesive-coated film splicing section applied on the top and bottom side of the roll connection to achieve a roll splice. The splice tape is applied around at least one, but possibly both sides, of the spliced roll with detachable foldable sections on at least one or both sides of the invention. In another embodiment, a perforation could be added to the arrangement without a stagger between the tape sections.

A splicing tape for accurately aligning and joining spliced component carrier reels is disclosed. The flexible splice tape allows the components to remain aligned and picked from a component carrier reel without interruption at the union of a first and second reel. The splice tape with an optional stiffening strip provides a flexible, yet strong connection to prevent back and forth, axial and lateral movement between spliced reels. The detection of the disclosed splice tape facilitates elimination of incorrect and mismatched components during splicing. The splice tape comprises a plastic-type material coated on one side with a pressure-sensitive adhesive composition. A protective paper covers the adhesive composition. The splice tape and protective paper are divided into sections using a staggered slit arrangement. The staggered slit arrangement aids in proper alignment and adhesion of the splice tape to component carrier reels.

A splice tape is disclosed that comprises a tape material, a protective paper covering an adhesive composition applied to one side of said tape material wherein said adhesive composition adheres said tape material to a component carrier reel joint, and a staggered slit arrangement cut into said tape material and said protective paper to form staggered sections between said tape material and said protective paper in order to easily remove sections of said protection paper to expose said adhesive composition for proper alignment and adhesion of said tape material to said component carrier reel joint. The component carrier reel joint comprises a first component carrier reel laterally aligned with a second component carrier reel. The tape material can be made of a thin plastic material, such as, for example, polyester, or other type of polymeric material. A stiffening strip made of brass, copper, or bronze, for example, can be attached to said tape material to prevent said component carrier reel joint from moving either axially or laterally when said splice tape is adhered to said component carrier reel joint. The metalized stiffening strip can also be used for inductive or visual sensing of spliced component carrier reels to determine splice location for a new feed of components.

The staggered slit arrangement in said tape material creates a first tape section, a second tape section, and third tape section. The staggered slit arrangement in said protective paper creates a first protective paper section, a second protective paper section, and third protective paper section. The first tape section adheres to an offset said first protective paper section, the second tape section adheres to an offset said second protective paper section, and the third tape section adheres to an offset said third protective paper section.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The disclosed embodiments comprise a two-layer construction with an adhesive coated film (with or without one section having additional layers for stiffening and detection) and a protective liner over the adhesive. The disclosed embodiments securely connect at least one side of a finishing and new roll with an adhesive coated film splicing section. The connection achieves a spliced union of the beginning and end of the finishing rolls, thus securing the tape's splice. The connection also bridges a film covering components in a component hole pocket on the opposing side of the roll.

Therefore, the spliced roll is securely connected both on the component carrier of the roll and on the cover tape of the roll.

Figure 1A:
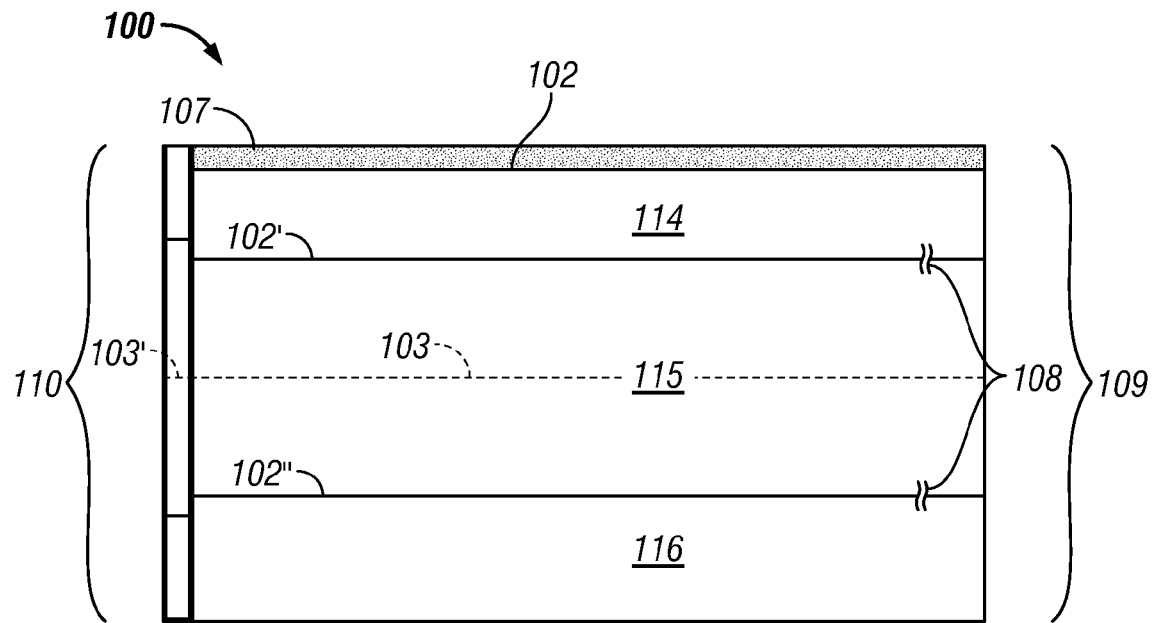
FIG. 1A illustrates a plan view of a first side of a splice tape, in accordance with the disclosed embodiments.

FIG. 1A illustrates a first side, or "tape side", of the splice tape 100 for aligning and connecting component carrier reels, in accordance with the disclosed embodiments. Component carrier reels can be aligned and connected utilizing a thin film splice tape 100 comprising polyester, or other plastic, polymeric, or flexible material, of any color or design. The spliced joint is strong, yet flexible to allow added components to be aligned in the reel without interruption at the union of first and second component carrier reels. The splice tape 100 can be divided using slits 102, 102', 102" between the different sections 107, 114, 115, and 116, respectively, comprising the tape side 109 (i.e., first surface). The divided sections 107, 114, 115, 116, either adhere to certain portions of a component carrier reel joint, while others are removed, as will be further described herein. The perforations or cuts in the protective paper and/or adhesive tape create foldable and staggered sections, thus maintaining continuity of the tape during application on a splice. Yet, the tape pieces are easily detached after application of the adhesive coated film on the top and bottom of the splice tape joint. The splice tape 100 is generally folded 103 in the second tape section 115 when adhering it to component carrier reels. The edge of the protective paper 110 (i.e., second surface) slightly extends from a first edge of the splice tape 100. The splice tape 100 eliminates the static shock-inducing plastic carrier of previous reel connecting splice designs.

The splice tape 100 may have a stiffening material section 107 to prevent the spliced component carrier reels from moving back and forth, either axially or laterally. The inclusion of a stiffening strip 107 on the splice tape 100 depends on the size of the component carrier reel. Smaller component carrier reels such as, for example, 4 mm reels, do not need an added stiffening strip to effectively secure the joint on the top tape sprocket feed hole side between component carrier reels as in the location of 107 above the component carrier feed holes. Alternatively, the stiffening strip can be attached to the underside of component carrier splicing tape, as illustrated, for example, in FIG. 23.

The stiffening material section 107 comprises metal or any other type of stiffening material that is either incorporated into the tape itself, or added as another section of the splice tape. The incorporated metal material such as, for example, brass, copper, or bronze can serve as a stiffening strip 107 for either inductive sensing or visual sensing of the spliced component carrier reels to determine splice location for a new feed of components. The stiffening strip 107 may also serve as a means of detecting the joint between the first and second spliced component carrier reels through visual blocking of the component's reel holes, or use of inductive sensible materials incorporated in the splice. The stiffening and inductive sensing metal could be incorporated onto the component carrier side of the component carrier reel. The stiffening strip 107 adheres to the reel joint to: strengthen the roll joint, provide inductive sensing detection of a metallic inlaid strip, or for visual detection of the adhesive coated film on the roll joint which covers openings in the rolls adjacent to the spliced joint.

The strip reinforces the strength of the spliced joint and/or as an aid in the detection of the splice joint through inductive detection systems or visual obstruction of openings in the roll which are obscured by the stiffening strip for visual detection systems. In another embodiment, the metallic strip (e.g., copper, bronze, etc.) that covers the reel holes provides for 100% opaqueness for visual detection systems and duplicates the bronze clip for inductive sensing systems with high reliability. The splice windows open as the feeder sprocket feeds into the component sprocket hole, this feature eliminates the possibility of gear contacting the adhesive on the splice and also 100% covers the sprocket holes with an opaque material for certain detection in visual systems. This splice is 100% detectable all feeder splice detection types.

The tape side 109 of the splice tape 100 may also have small notches 108, or indentions or nicks, between tape sections 107, 114, 115, 116 to aid in holding these sections together when the splice tape 100 is applied to a joint between component carrier reels. Tape sections 114, 115, 116 are also known as first section, second section, and third section, respectively. It is important to note that these notches 108 do not serve to align or attach the splice tape 100 with the component carrier reel, but rather lends further support and initial connectivity between tape sections 107, 114, 115, 116 of the splice tape 100. In another embodiment, the protective liner and/or tape can include cuts, or notches, that allow for alignment of the roll joint, both visually or with external alignment tools.

Polyester can be added in certain areas of the tape to add strength between pieces of the tape. The polyester prevents the tape pieces from being pulled apart at the incorrect time when being fed through the feeder machine. For example, 2 mm polyester can be added on the tape's surface of FIG. 1A to strengthen the joint between tape pieces. In another embodiment, the tape can comprise a clear or transparent material instead of the metallic and/or stiffening strip material. Some feeders have jamming issues with various splicing tapes. Improved feeder performance results in decreased tape contamination once the adhesive has been removed and the adhesive composition is exposed.

Figure 1B:
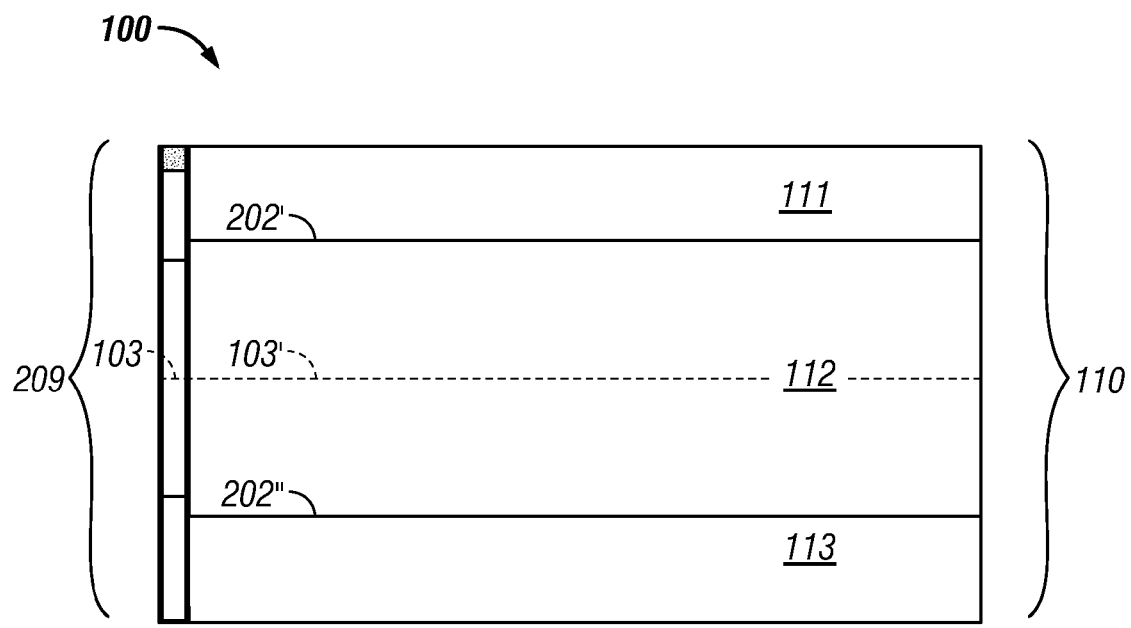
FIG. 1B illustrates a plan view of a second side of a splice tape, in accordance with the disclosed embodiments.

FIG. 1B illustrates a second side, or "protective paper side", of the splice tape 100, in accordance with the disclosed embodiments. The protective paper side of the splice tape 100 comprises a protective paper 110 that adheres to the tape side that is covered with an adhesive composition 209. The protective paper 110 is used to help grip the splice tape 100 for proper application to component carrier reels. The protective paper 110 is later removed to expose the adhesive composition 209 on the tape. The adhesive composition 209 is used to secure the splice tape 100 to component carrier reels, thus connecting the reels for seamless feeding through machinery that loads components from the component carrier reels into various devices.

The protective paper 110 can include slits 202', 202" located in different locations to allow removal of the protective paper 110 covering certain tape sections 111, 112, and 113 of the splice tape 100. The adhesive composition 209 covering a certain tape section 111, 112, and 113 is then exposed for adhesion of the splice tape 100 onto the component carrier reels to form a strong, yet flexible joint. A fold line 103' helps guide proper folding of the splice tape 100 into position to form the joint between component carrier reels.

Figure 2A:
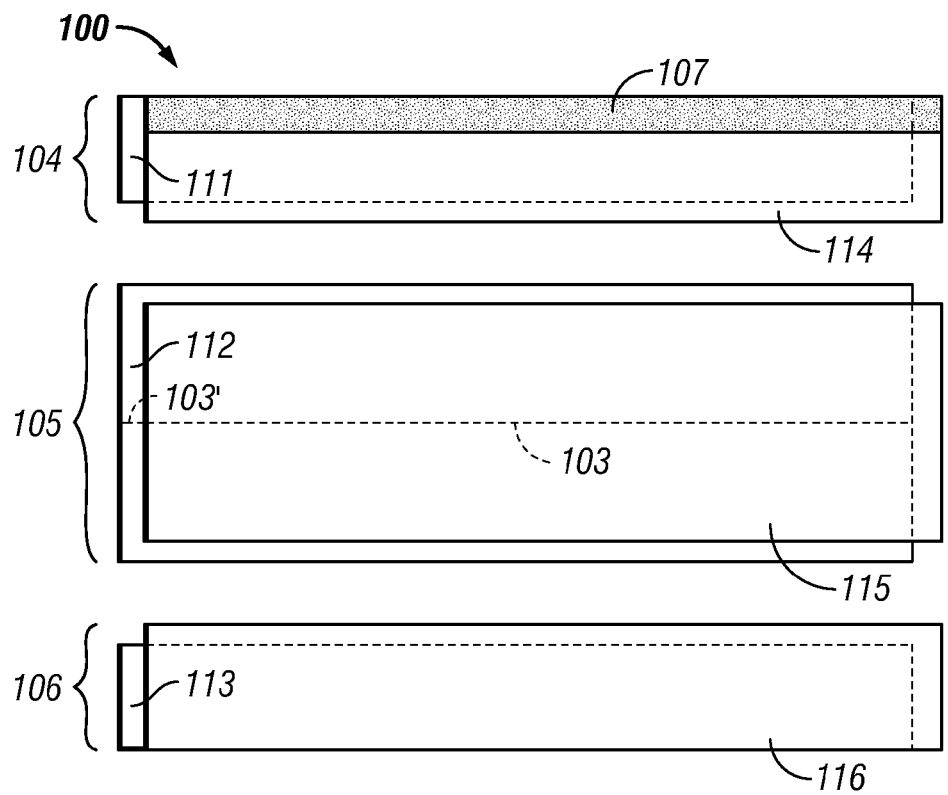
FIG. 2A illustrates an exploded plan view of a first side of a splice tape, in accordance with the disclosed embodiments.
Figure 2B:
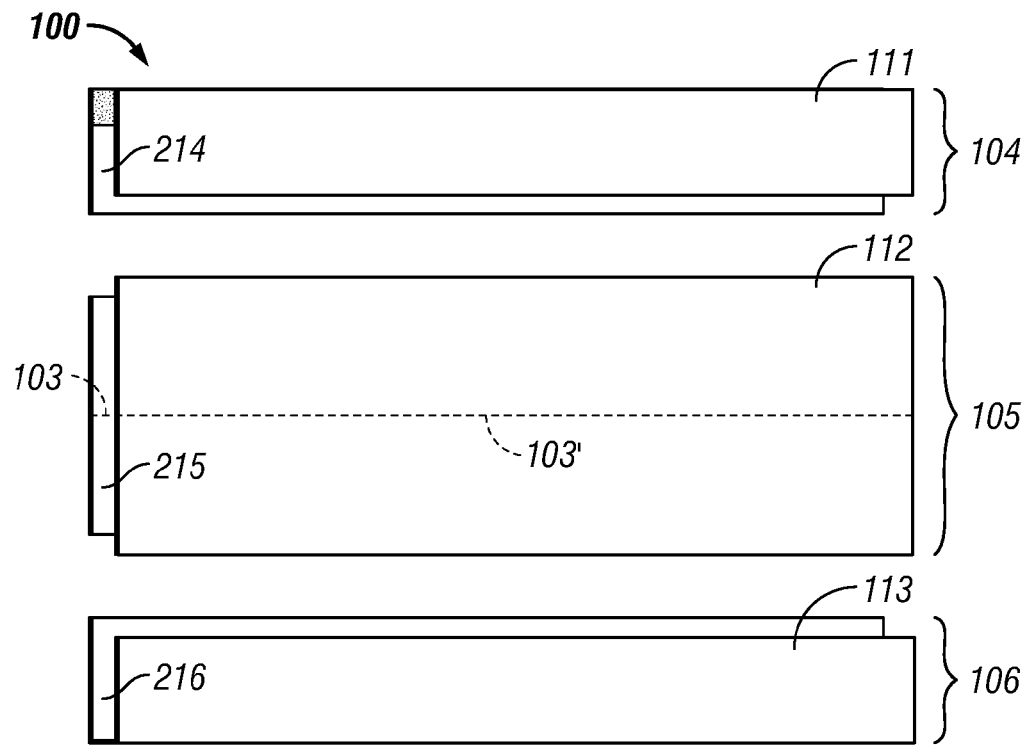
FIG. 2B illustrates an exploded plan view of a second side of a splice tape, in accordance with the disclosed embodiments.

FIGS. 2A and 2B illustrate exploded plan views of the tape side and protective paper side of the splice tape 100, respectively, in accordance with the disclosed embodiments. The slits 102, 102', 102" in the tape side are staggered with the slits 202', 202" in the protective paper 110 on the protective paper side of the splice tape 100. Slit 102 divides the stiffening strip 107 and the top of the first section of tape material 114. Slit 102' divides the bottom of the first section of tape material 114, also known as the "cover tape section", and the top of the second section of tape material 115. Slit 102" divides the bottom of the second section of tape material 115 and the top of the third section of tape material 116, also known as the "component carrier reel section". Slit 202' divides the bottom of the first section of protective paper 111 from the top of the second section of protective paper 112. Slit 202" divides the bottom of the second section of protective paper 112 from the top of the third section of protective paper 113. This staggered slit arrangement allows the proper alignment, tape adhesion, and removal of the protective paper 110 from the tape side covered with the adhesive composition 209 when the splice tape 100 adheres to component carrier reels.

The staggered slit arrangement of the splice tape 100 further aids in adhering each tape section 114, 115, 116 and protective paper section 111, 112, 113 to each other to form complete sections 104, 105, 106 of tape adhered to protection paper. Protective paper sections 111, 112, 113 are also known as fourth section, fifth section, and sixth section, respectively. The first complete section 104 of the splice tape 100 comprises the stiffening strip 107, a first section of tape material 114, a first section of tape material with adhesive 214, and a first section of protective paper 111. The first section of protective paper 111 slightly extends past one side of the first section of tape material 114. The bottom of the first section of tape material 114 extends past the bottom edge of the first section of protective paper 111. Therefore, the bottom edge of the first section of tape material 214 adheres to the top portion of the second section of protective paper 112.

The second complete section 105 of the splice tape 100 comprises a second section of tape material 115, a second section of tape material with adhesive 215, a fold line 103, 103', and a second section of protective paper 112. The second section of protective paper 112 slightly extends past three sides (the top edge, the first side edge, and the bottom edge) of the second section of tape material 115. The second side edge of the second section of tape material 115 extends past the edge of the second section of protective paper 112. Therefore, the top edge of the third section of tape material 216 adheres to the bottom portion of the second section of protective paper 112, and the bottom edge of the first section of tape material 214 adheres to the top portion of the second section of protective paper 112.

The third complete section 106 of the splice tape 100 comprises a third section of tape material 116, a third section of tape material with adhesive 216, and a third section of protective paper 113. The third section of protective paper 113 slightly extends past one side of the third section of tape material 116. The top of the third section of tape material 116 extends past the top edge of the third section of protective paper 113. Therefore, the bottom edge of the first section of tape material 214 adheres to the top portion of the second section of protective paper 112. The top edge of the third section of tape material 216 then adheres to the bottom portion of the second section of protective paper 112.

Figure 3:
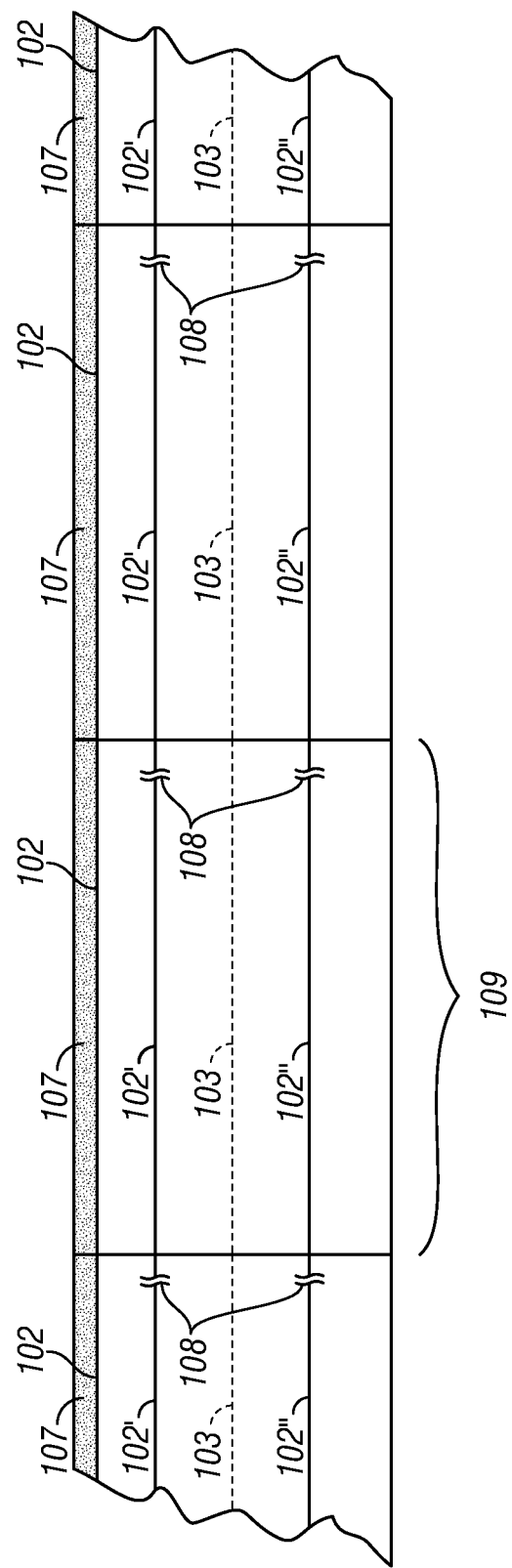
FIG. 3 illustrates a plan view of a multiple units of splice tape, in accordance with the disclosed embodiments.

FIG. 3 illustrates a graphical representation of several units of splice tape 100 connected in a roll of splice tape, in accordance with the disclosed embodiments. The protective paper 110 in FIG. 1A adheres to the tape material with the adhesive composition 209 of FIG. 1B to form infinite units of splice tape 100 dispensed either from a roll or another dispensing mechanism. The desired units of splice tape 100 can be removed from a roll of multiple sections of splice tape 100, as shown in FIG. 3.

The application of the splice tape 100 to form a strong, yet flexible, joint between component carrier reels is described in FIGS. 4 to 14. It is understood that an 8 mm exemplary component carrier reel is illustrated in FIGS. 4 to 14. The disclosed splice tape may be used on any size component carrier reel and is not limited only to 8 mm component carrier reels. It is further understood that FIGS. 4 to 14 illustrate an exemplary, manual method for applying the splice tape to component carrier reels. The disclosed splice tape may be applied in either a manual, semi-automated, or automated manner, and is not limited to any one of these particular methods of use or application. FIGS. 15-21 illustrate an exemplary method of applying the disclosed splicing tape to connect component carrier reds using a fixture to align the reds for splicing, in accordance with the disclosed embodiments. A hand or cart mounted tool could be developed where an operator cuts and preps the ends of the component carrier reels, and places the ends of the reels in a similar fixture. Using rolls of disclosed splice tape 100, an automated system using such as, for example, a label application-type machine could apply the splice tape to the top and bottoms of the component carrier reds as disclosed herein. Either an automated or manual system could ensure the splice rape 100 is properly adhered to the component carrier reels and dispose of the removed portion of folded splice tape 100. It is understood that component carrier reds can carry any number or combination of different components such as electrical components, including resistors, capacitors, or IC's, or a mechanical component, such as a screw, or any combination of components.

Figure 4:
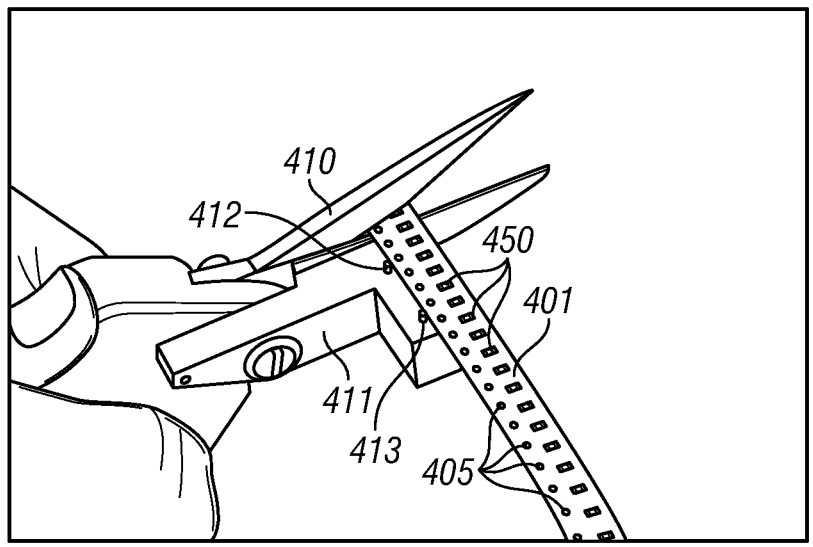
FIGS. 4 to 14 illustrate graphical representations of the application of the splice tape to component carrier reels, in accordance with the disclosed embodiments.

FIG. 4 illustrates an exemplary mandrel 411 for cutting and aligning the component carrier reds 401, 402 to be aligned using the splice tape 100, in accordance with the disclosed embodiments. The mandrel 411 is attached to a pair of scissors 410, or any other type of manual or automated cutting or trimming device. The mandrel 411 attached to a pair of scissors 410 works for trimming all sizes of component carrier reels 401, 402. Both ends of the component carrier reels 401, 402 are aligned using alignment pins 412, 413 in the appropriate locations on the mandrel 411 attached to a pair of scissors 410. The alignment pins 412, 413 can also be sized to receive the feeder holes 405 of the component carrier reels 401, 402 for further alignment. The scissors 410 then trim the ends of the component carrier reels 401, 402 to the appropriate size to form a proper connection between reds 401, 402.

Figure 5:
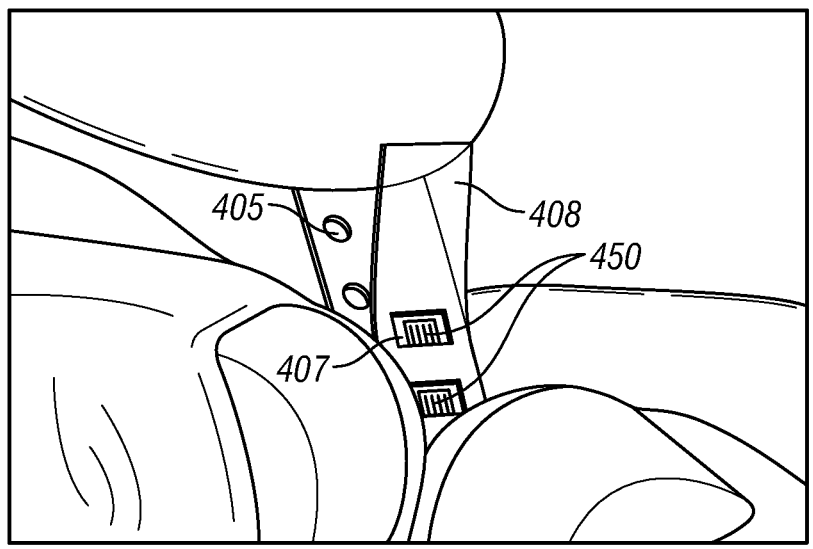

As illustrated in FIG. 5, the top cover tape 408 of the component carrier reels 401, 402 can be lifted before trimming the reds 401, 402 using the mandrel 411 attached to a pair of scissors 410, in accordance with the disclosed embodiments. The cover tape 408 is used to hold components 450 in place within the component pockets 407 of the component carrier reels 401, 402. It is understood that the exemplary mandrel 411 attached to a pair of scissors 410 is a non-limiting example of a method of cutting component carrier reels 401, 402 to size. This process can be performed either manually, in a semi-automated fashion, or fully automated fashion. The components 450 are exposed for picking and placing by removing the top cover tape 408 and any attached splice tape 100. The attached splice tape 100 does not interfere with either feeding through machinery or removal of the top cover tape 408. Component carrier reels 401, 402 usually have components 450 in the component pockets 407. Component pick and place machines (not illustrated) take component carrier reels 401, 402 loaded with components 450 within the component pockets 407, pull the cover tape 408 off, and pick components 450 out of the pockets 407. The pick and place machine then places the components 450 onto circuit boards for use in electronic equipment, or any other type of device.

Figure 6:
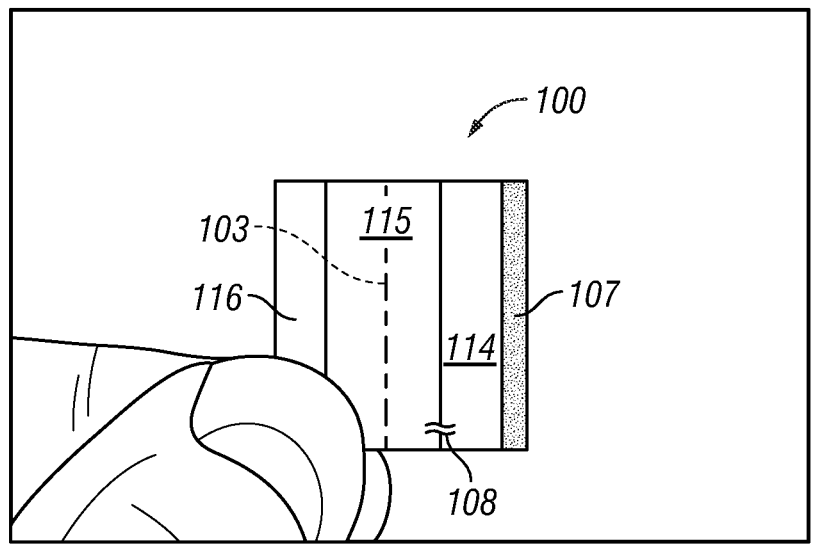

FIG. 6 illustrates a single unit of splice tape 100 for application to component carrier reels 401, 402, in accordance with the disclosed embodiments. The single unit of splice tape 100 is comprised of the stiffening strip 107, first section of tape material 114, the second section of tape material 115, and the third section of tape material 116. A fold line 103 bisects the second section of tape material 115 and guides folding the splice tape 100 around a component carrier reel. Notches 108 help hold sections 107, 114, 115, and 116 together before application to a reel.

Figure 7:
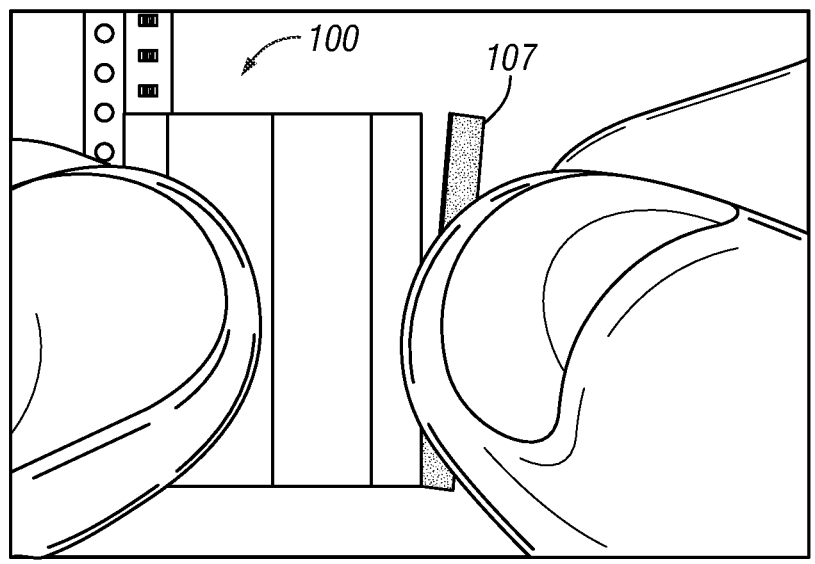

FIG. 7 illustrates an optional removal of stiffening strip 107 for placement on smaller component carrier reels, in accordance with the disclosed embodiments. Smaller component carrier reels such as, for example, 4 mm reels do not need an added stiffening strip to effectively secure the joint on the top tape sprocket feed hole side between component carrier reels as in the location of 107 above the component carrier feed holes.

Figure 8:
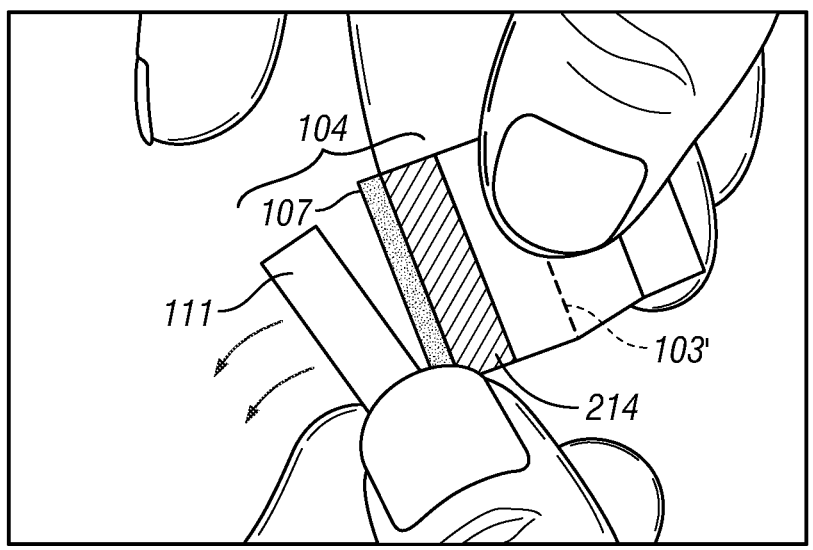
Figure 9:
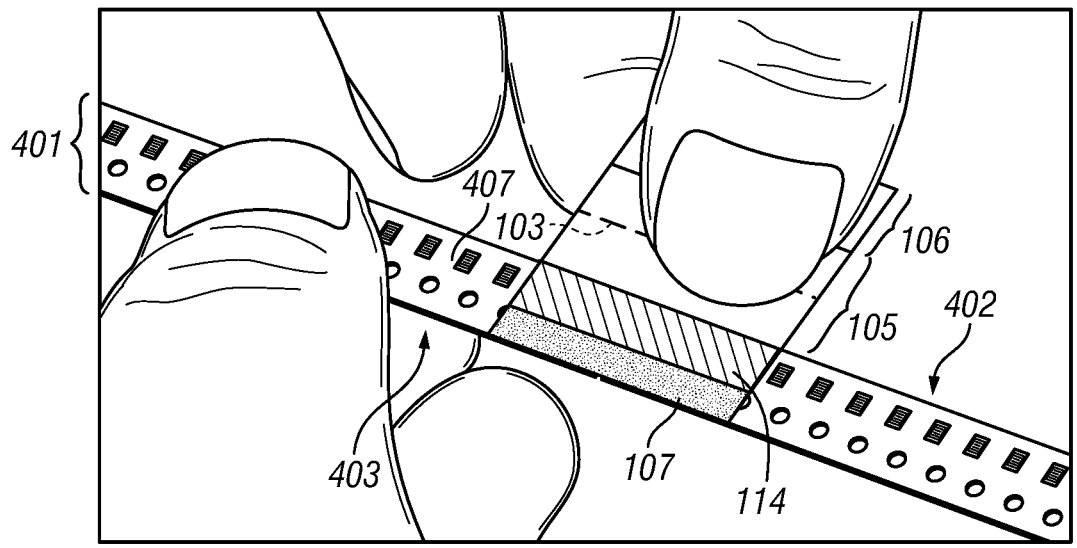
Figure 10:
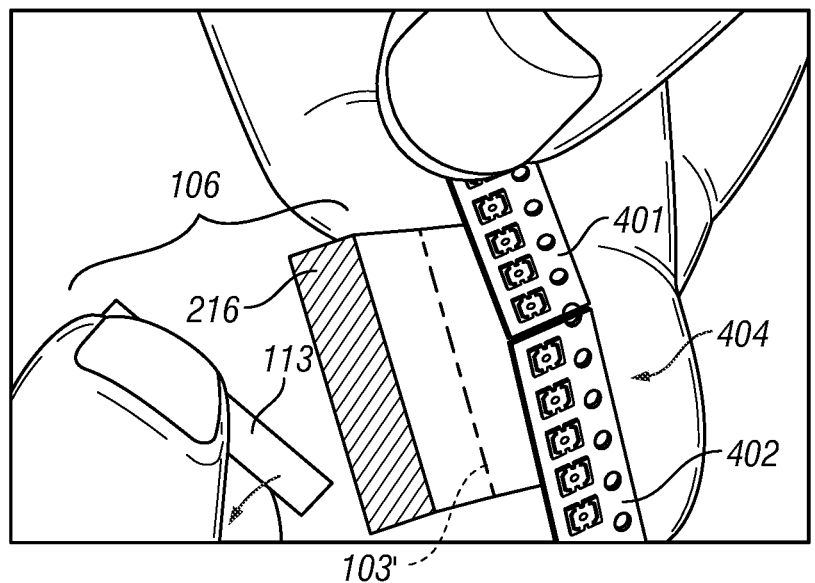
Figure 11:
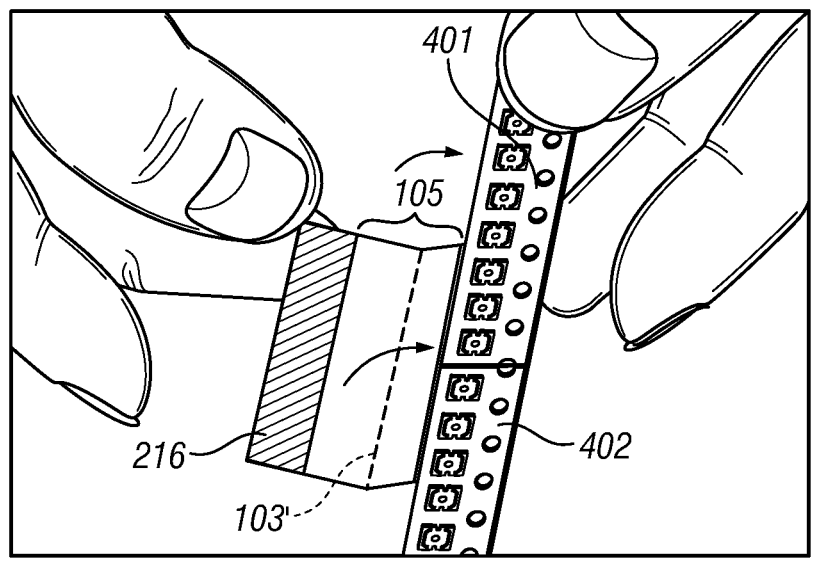
Figure 12:
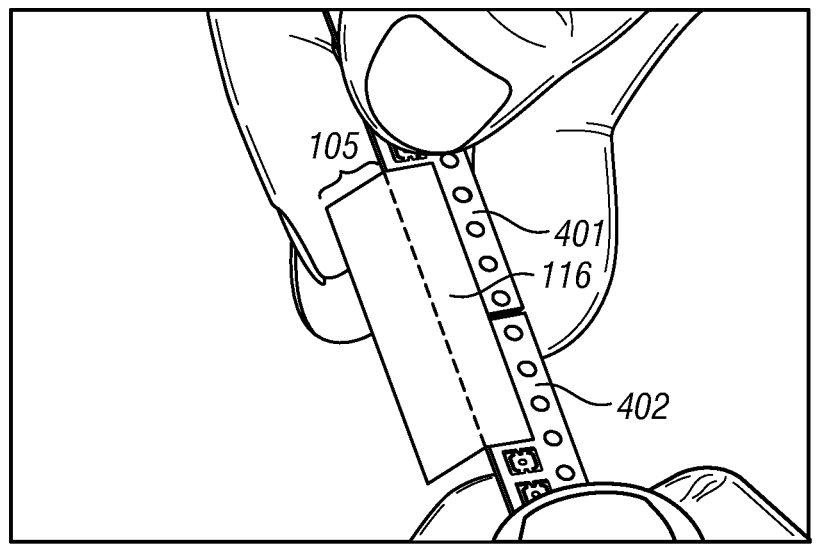

In FIG. 8, the first section of protective paper 111 is removed from first section 104 of the splice tape 100, thus exposing the adhesive side 214. In FIG. 9, a first section of tape material 114 and the stiffening strip 107 are adhered to the top side 403 of component carrier reels 401, 402, thus covering a portion of the top cover tape 408 on top of component wells 407. In FIG. 10, the component carrier reels 401, 402 are flipped over to the underside 404. The third section of protective paper 113 is then removed from the third complete section of tape material 106 to expose a third section of tape material with adhesive 216. In FIG. 11, the third section of tape material with adhesive 216 and the portion of the middle section 105 of splice tape above the fold line 103' are folded towards the underside 404 of the component carrier reels 401, 402. In FIG. 12, the third section of tape material 116 is adhered to the underside 404 of the component carrier reels 401, 402, thus forming a strong, yet flexible joint between reels 401, 402. The adhered third section 116 of splice tape 100 covers the exterior portion of the component pockets 407, but does not cover or interfere with the feeder holes 405 of the component carrier reels 401, 402. The spliced component carrier reels therefore easily feed through machines adding components at a later time.

Figure 13:
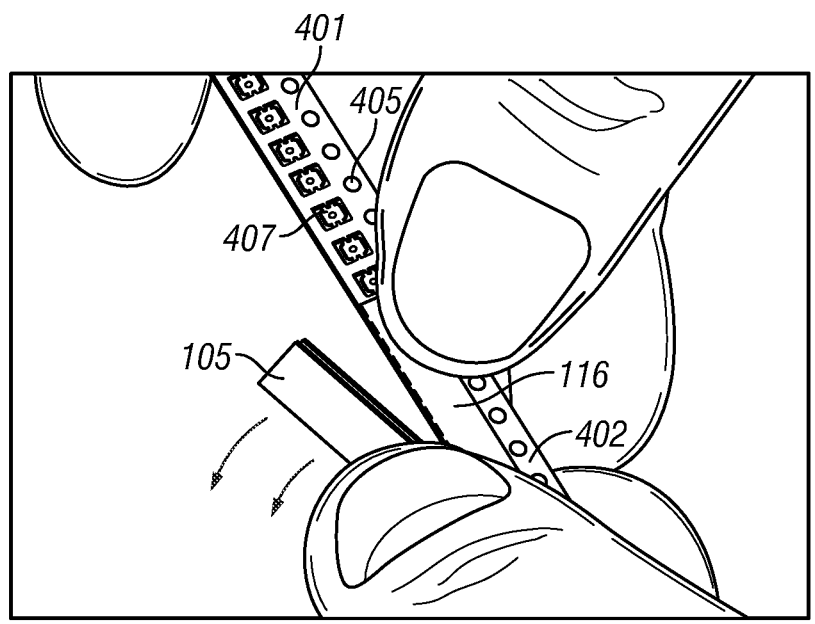
Figure 14:
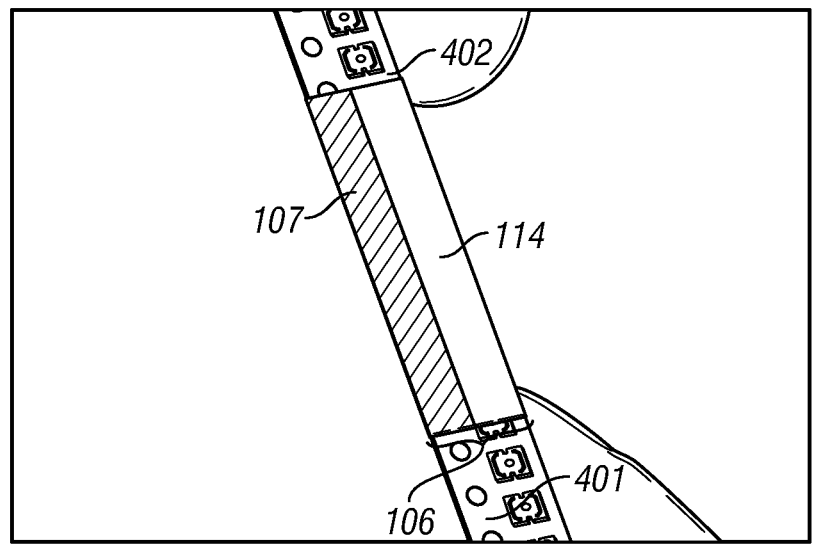

In FIG. 13, the folded second section 105 of splice tape 100 is removed, along with the second section of protective paper 112 still attached to the adhesive 215 on the second section 105 of splice tape. The folded second section 105 of splice tape 100 hanging off the component carrier reels 401, 402 is easily removed from the spliced reel joint by a shearing movement. The removal of complete tape section 105 does not cause a static shock that may damage components 450. FIG. 14 illustrates the completed, spliced component carrier reels 401, 402 with the attached splice tape 100, showing adhered tape sections 107 and 114.

Figure 15:
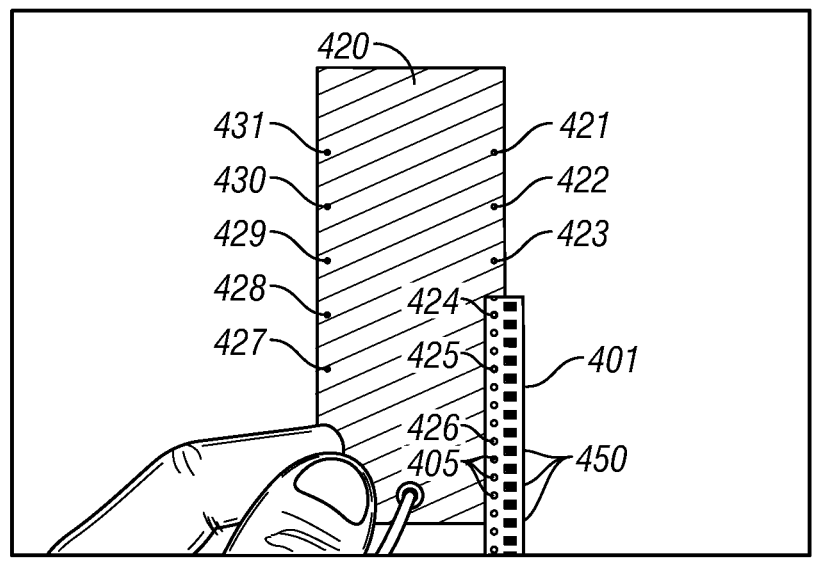
FIGS. 15 to 21 illustrate graphical representations of the application of the splice tape to component carrier reels using an alignment fixture, in accordance with the disclosed embodiments.
Figure 16:
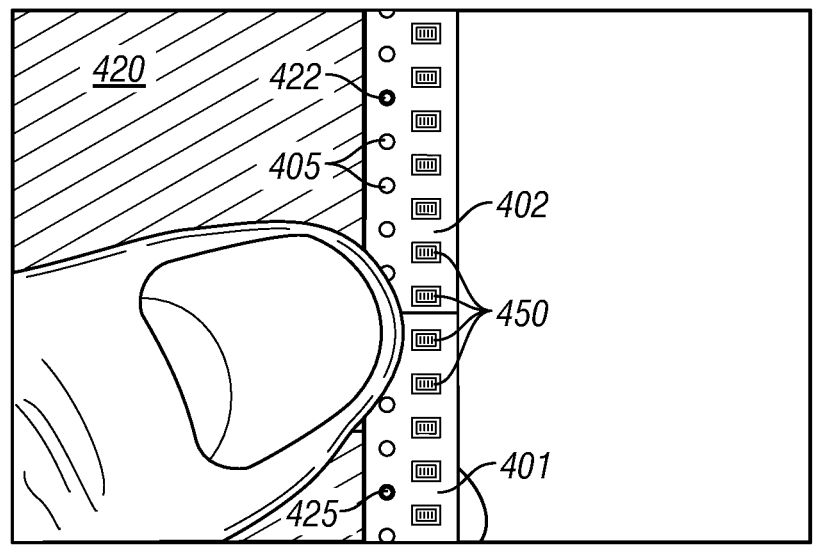

FIGS. 15-21 illustrate an exemplary method of applying the disclosed splicing tape 100 to component carrier reels using an alignment fixture 420 to align the component carrier reels 401, 402 for splicing, in accordance with the disclosed embodiments. In FIG. 15, a component carrier reel 401 is aligned on an exemplary alignment fixture 420 to aid in alignment of component carrier reels 401, 402. Alignment fixture 420 can be comprised of any type of stiff material, such as, for example, plastic or metal. The feeder holes 405 of component carrier reel 401 can be aligned on the alignment fixture 420 using any number of alignment pins 421 to 431 that outwardly extend from the alignment fixture 420. Alignment pins 421 to 431 can be sized to receive any size feeder holes 405 of any size component carrier reel 401. Feeder holes 405 of component carrier reel 401 are aligned on alignment pins 424, 425, 426 in FIG. 15. Alignment pins 421, 422, 423 are sized to receive and fit feeder holes 405 on component carrier reel 402. When aligned using the alignment fixture 420, component carrier reels 401, 402 laterally align to form a joint, as illustrated in FIG. 16.

Figure 17:
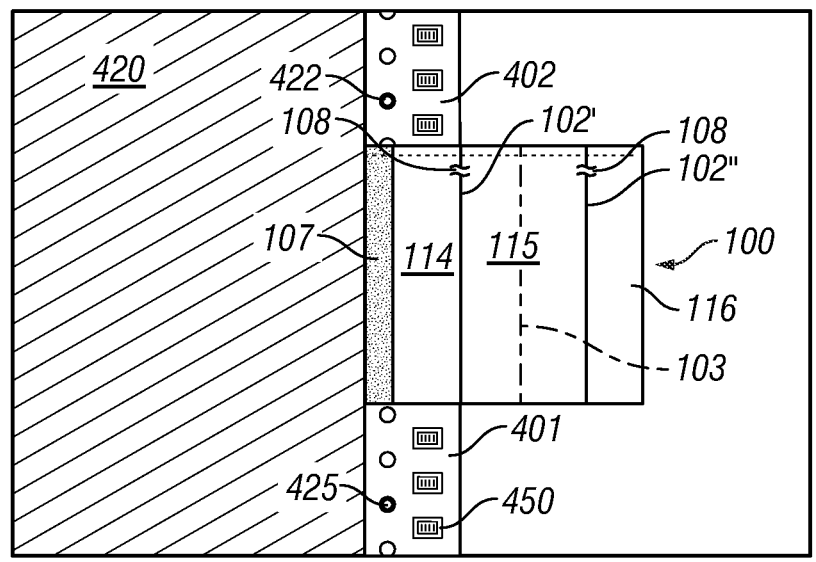

FIG. 17 illustrates adhesion of splice tape 100 to component carrier reels 401, 402 using an alignment fixture 420, in accordance with the disclosed embodiments. The first section of protective paper 111 is first removed from the back of the supporting strip 107 and the first tape section 114 to expose its adhesive side 214. The adhesive side of the supporting strip 107 is adhered over the feeder holes 405 of the joint of the component carrier reels 401, 402. The adhesive side 214 of the first tape section 114 is adhered on top cover tape 408 of the component carrier reels 401, 402. Therefore the slit 102' is aligned in a parallel manner with the edge of the component carrier reels 401, 402.

Figure 18:
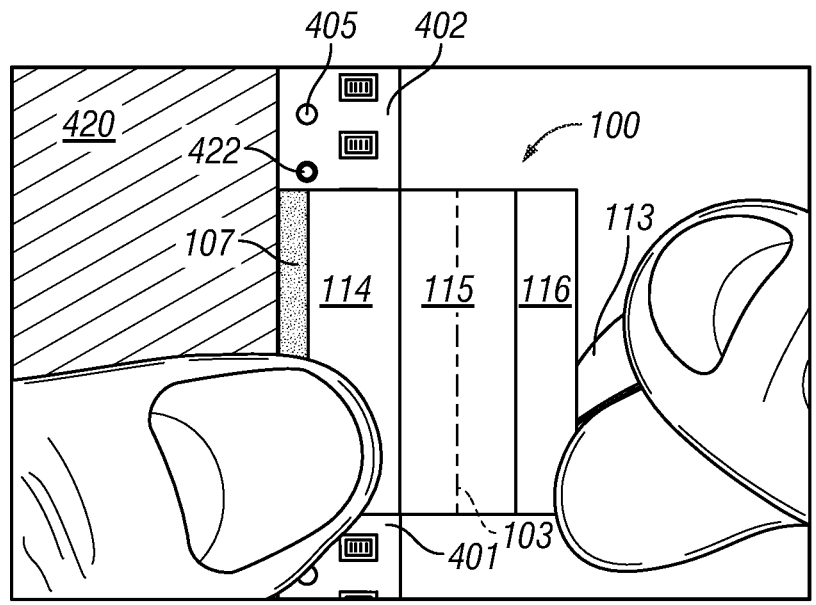
Figure 19:
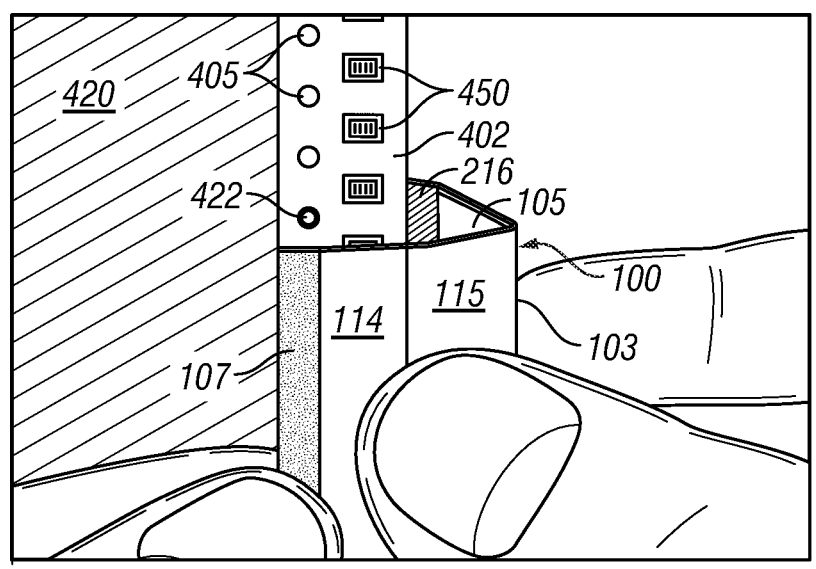
Figure 20:
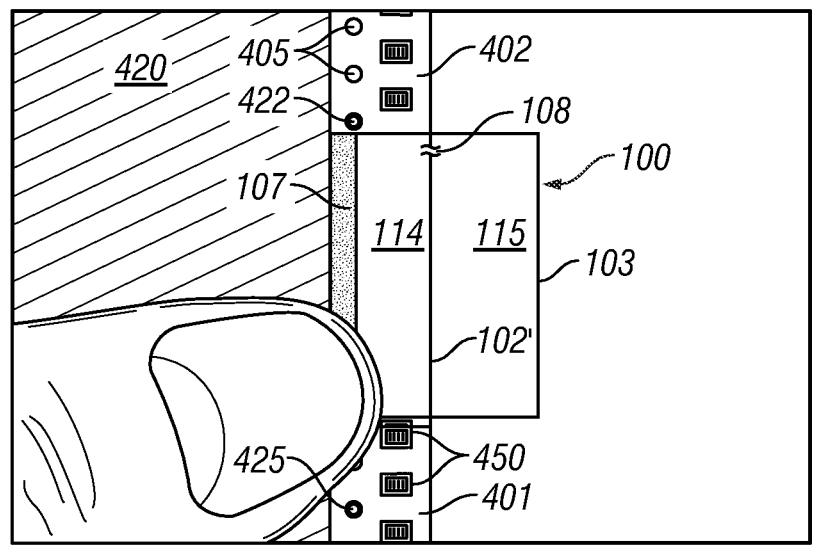

In FIG. 18, the third section of protective paper 113 is then removed from the back of the third section 116 of splice tape 100 to expose the adhesive side 216 (not shown). Thereafter, third tape section 116 is folded towards the bottom side of the component carrier reels 401, 402, as shown in FIG. 19. The splice tape folds in half at the fold line 103 that bisects section 115. In FIG. 20, the adhesive side 216 of splice tape 100 section 116 is then adhered to the back portion of the component carrier reels 401, 402. The alignment fixture 420 does not interfere with adhesion of the splice tape 100, but rather aid in alignment to form an accurate joint between reels 401, 402.

Figure 21:
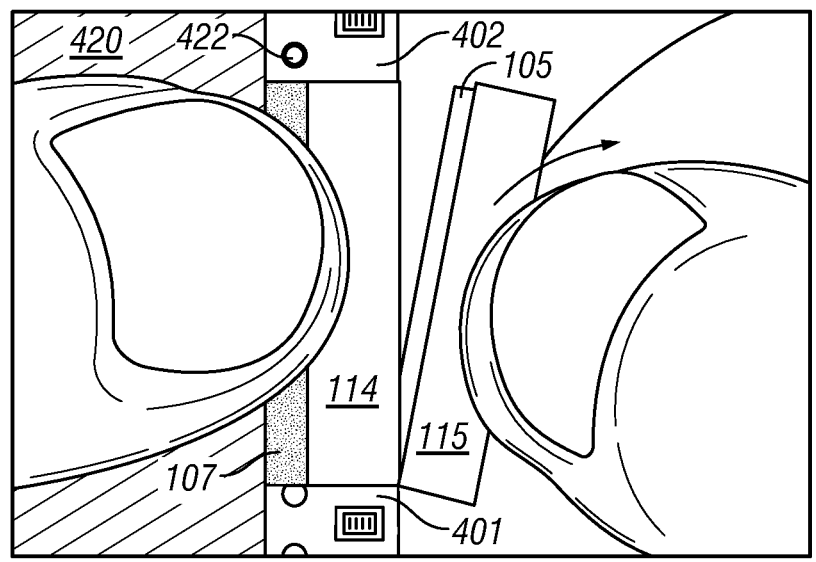
Figure 22:
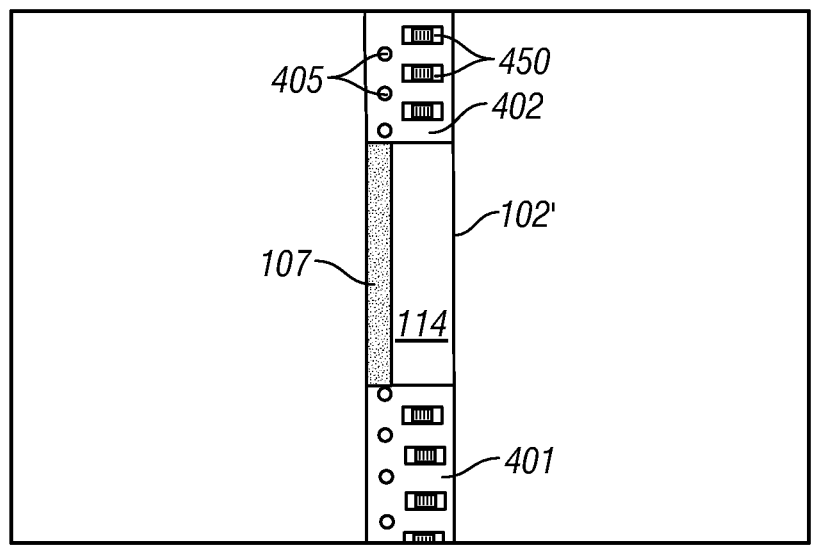
FIG. 22 illustrates a graphical representation of an exemplary spliced 8 mm component carrier reels, in accordance with the disclosed embodiments.

The second complete section 105 of the splice tape 100 is then pulled away from the adhered sections 107, 114, and 116, as illustrated in FIG. 21. The second complete section 105 of the splice tape 100 shears from adhered sections 114 and 116 at slits 102' and 102", respectively. The second protective paper 112 is still attached to the back of second tape section 115. In FIG. 22, the component carrier reels 401, 402 have been removed from the alignment fixture 420 and are ready for feeding through component pick and place machinery (not illustrated).

Figure 23:
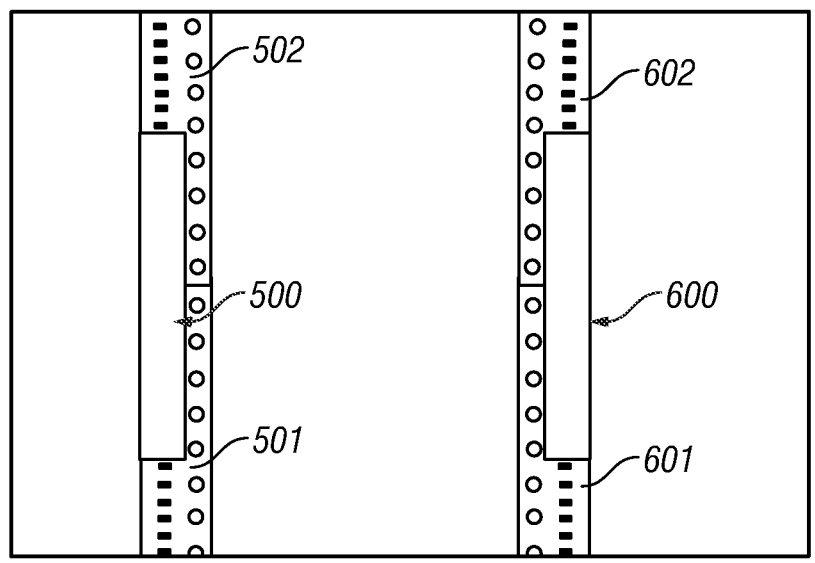
FIG. 23 illustrates a graphical representation of exemplary spliced 4 mm component carrier reels, in accordance with the disclosed embodiments.
Figure 24:
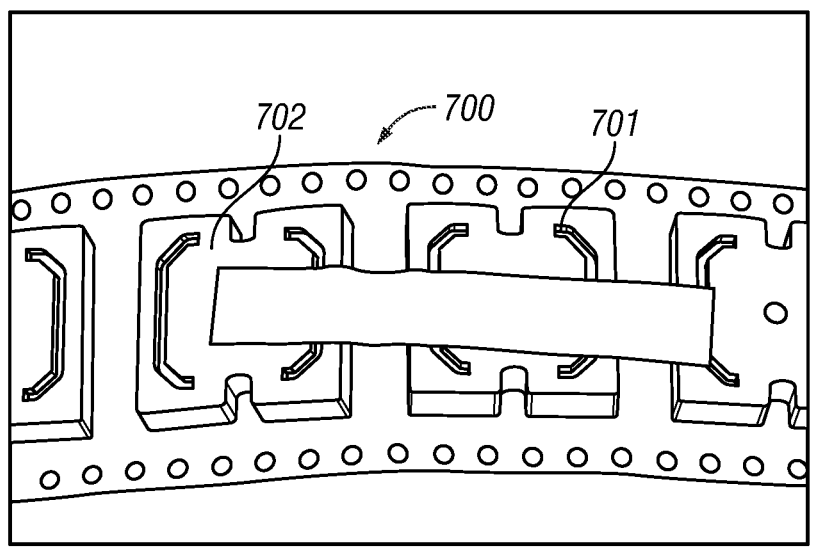
FIGS. 24 and 25 illustrate a graphical representation of exemplary spliced 24 mm component carrier reels, in accordance with the disclosed embodiments.
Figure 25:
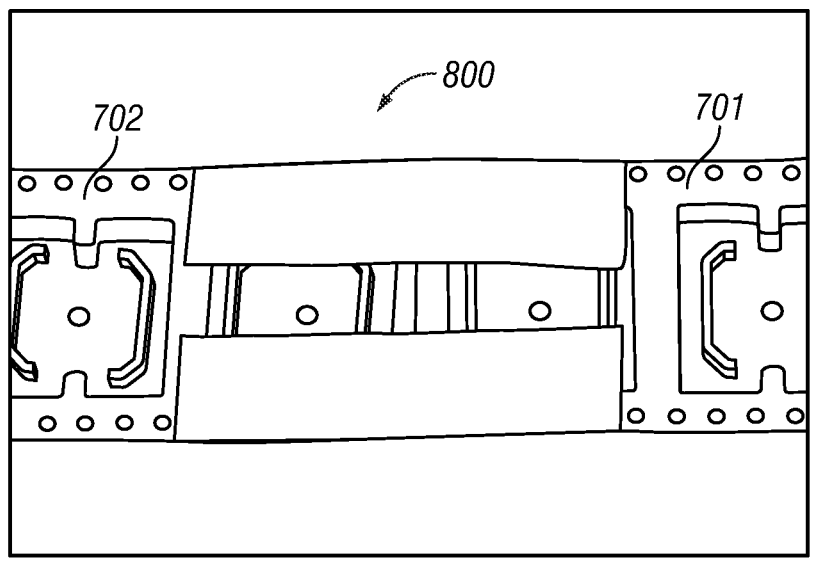

FIGS. 23-25 illustrate graphical representations of exemplary component carrier reels 501, 502, 601, 602, 701, 702, in accordance with the disclosed embodiments. It is understood that the splice tape disclosed herein is not limited to any particular size or dimensions. It is further understood that any size component carrier reel can be connected using the disclosed splice tape. In FIG. 23, splice tape 500 is applied to the underside, or "pocket side" of component carrier reels 501, 502 in accordance with the disclosed embodiments described in FIGS. 4 to 21. For use on smaller component carrier reels such as the exemplary 4 mm reel 501, 502, the metalized supporting strip 107 can either be used to connect the reels 501, 502 or removed to allow attachment in accordance with the embodiments disclosed in FIGS. 4 to 21. On the cover tape side, a non-metalized tape 600 is used to connect the ends of the component carrier reels 601, 602. The 4 mm component carrier reels are exemplary reels showing application of the disclosed splice tape 100 on smaller component carrier reels and is not solely limited to application on the 4 mm reels.

FIGS. 24 and 25 illustrate the application of the splice tape 700, 800 on 24 mm component carrier reels 701, 702, in accordance with the disclosed embodiments. Splice tape 800 is applied twice using the steps described in FIGS. 4-21. The 24 mm component carrier reels are exemplary reels showing application of the disclosed splice tape 100 on larger component carrier reels and is not solely limited to application on the 24 mm reels. For larger component carrier reels 701 702, additional support for the component carrier reel joint may be needed. The disclosed splice tape is applied as described in FIGS. 4 to 21 on both sides of the 24 mm component carrier reels 701, 702. Further support may be added using an additional portion of splice tape 700 on the bottom side of the component carrier reel.

Figure 26:
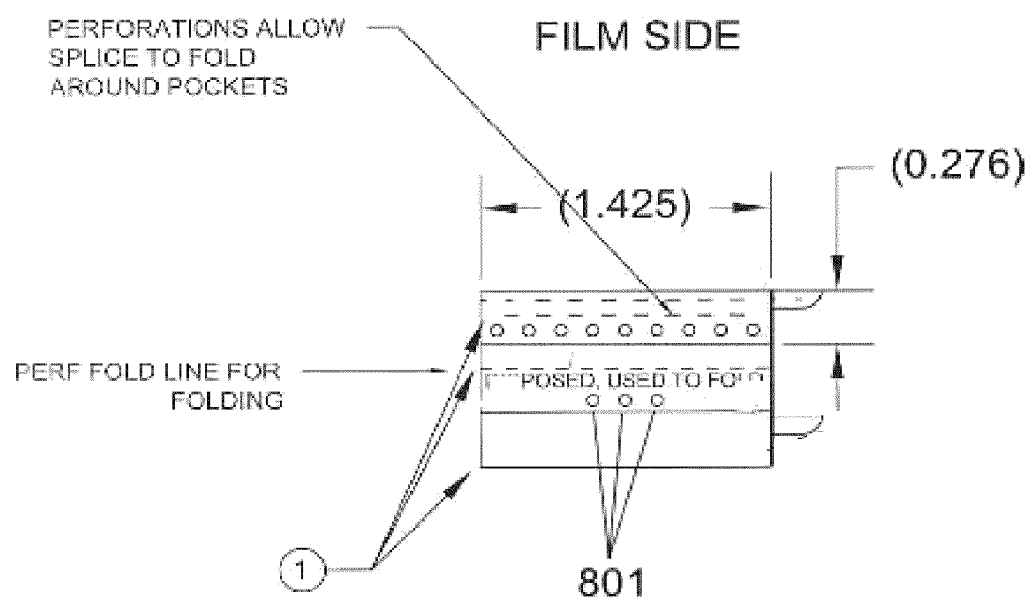
FIG. 26 illustrates a graphical representation of exemplary alignment holes in the first side of a splice tape, in accordance with the disclosed embodiments.
Figure 27:
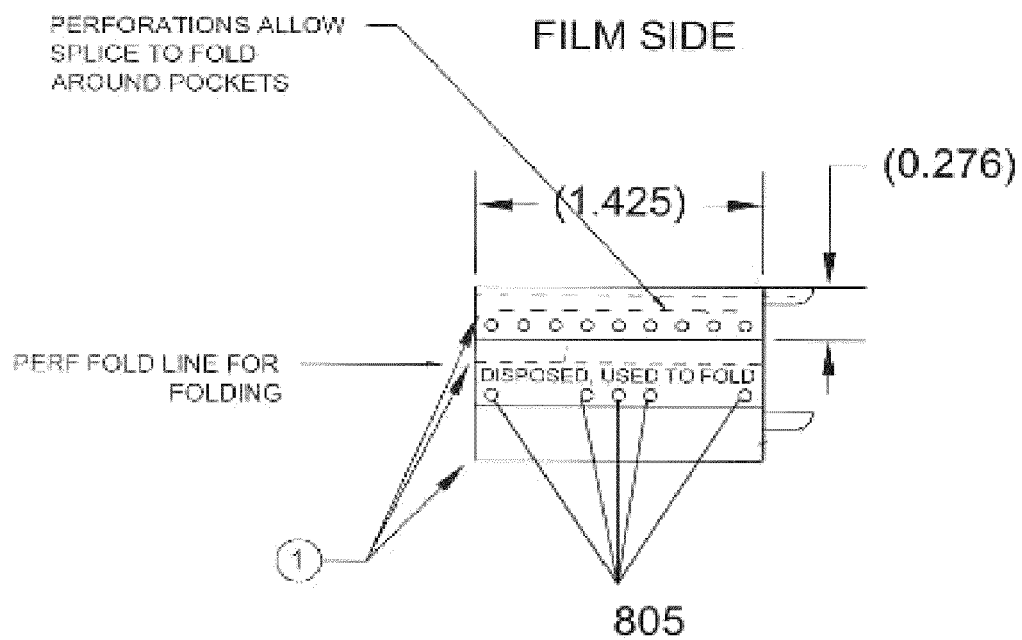
FIG. 27 illustrates a graphical representation of exemplary alignment holes across the tape material, in accordance with the disclosed embodiments.
Figure 28:
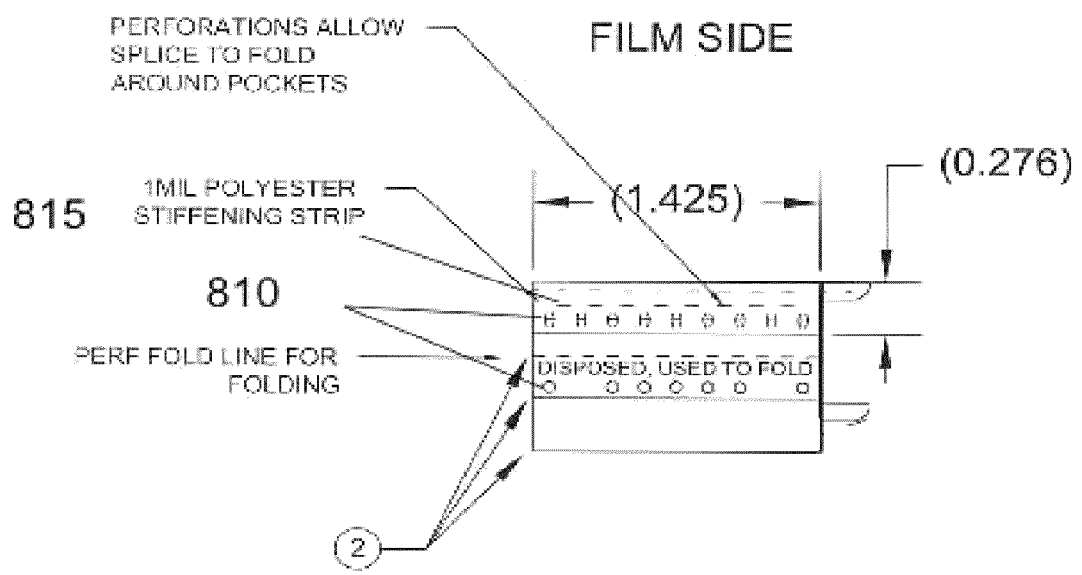
FIG. 28 illustrates a graphical representation of exemplary alignment windows and a polyester stiffening strip across the tape material, in accordance with the disclosed embodiments.
Figure 29:
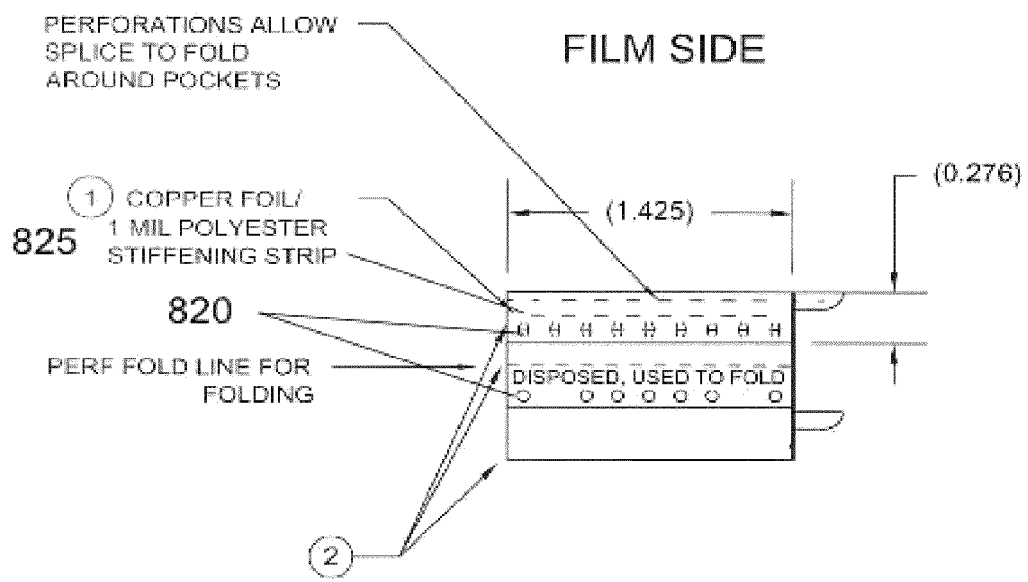
FIG. 29 illustrates a graphical representation of exemplary alignment windows and a polyester or metal stiffening strip across the tape material, in accordance with the disclosed embodiments.
Figure 30:
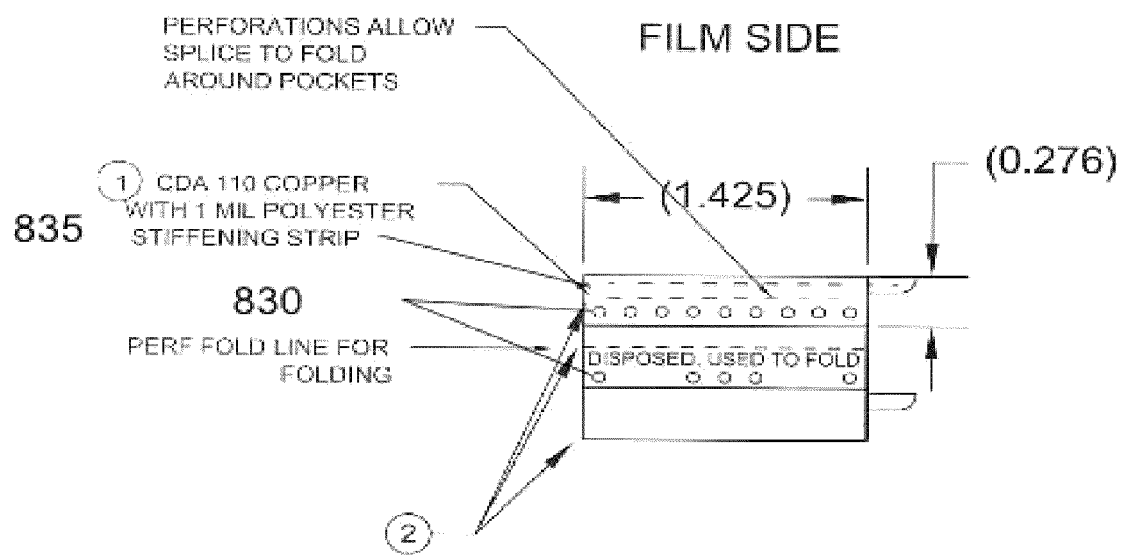
FIG. 30 illustrates a graphical representation of exemplary alignment holes and a polyester stiffening strip across the tape material, in accordance with the disclosed embodiments.
Figure 31:
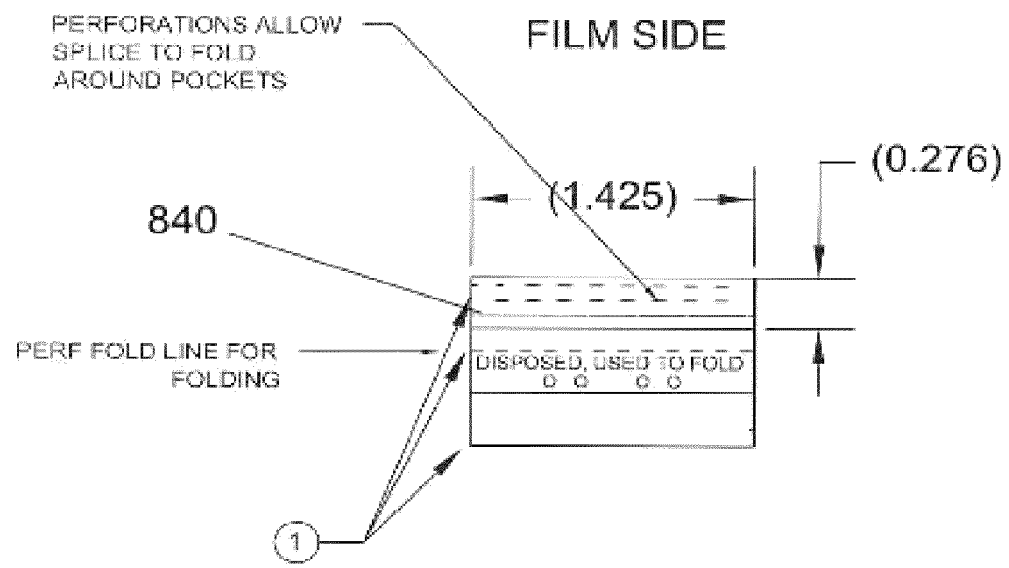
FIG. 31 illustrates a graphical representation of an exemplary horizontal cut across the tape material, in accordance with the disclosed embodiments.

Exemplary alignment holes, notches, or indentions can be included on a first surface of the splice tape, as illustrated in FIGS. 26-31. FIG. 26 illustrates a graphical representation of exemplary alignment holes 801 in the first side of a splice tape. FIG. 27 illustrates a graphical representation of exemplary alignment holes 805 across the tape material. FIG. 28 illustrates a graphical representation of exemplary alignment windows 810 and a polyester stiffening strip 815 across the tape material. FIG. 29 illustrates a graphical representation of exemplary alignment windows 820 and a polyester and/or metal stiffening strip 825 across the tape material. FIG. 30 illustrates a graphical representation of exemplary alignment holes 830 and a polyester stiffening strip 835 across the tape material. FIG. 31 illustrates a graphical representation of an exemplary horizontal cut across the tape material.

The alignment holes can comprise a plurality of holes (e.g., three to seven holes, for example) for use with a fixture to locate and align a splice. The alignment holes can cover the reel holes and block incoming light for visual detection of the location of the reel holes when covered in the disclosed tape. The invention achieves secure and precise splicing of two sides of a component carrier roll with alignment features. The alignment features can be used with and without an external roll alignment tool. The tape has a foldable detachable section for use as an assembly aid for placement of the adhesive coated film sections. The tape pieces or sections remain adhered to the joint of the connected rolls splicing the top and bottom side of the roll. Notches in the tape and/or protective paper can be added to strengthen joint between tape pieces. The notches serve to hold the individual tape pieces together axially.

In other embodiments, an exemplary line could be cut horizontally through the tape, as illustrated in FIG. 27. Therefore, the tape does not have to be registered in a certain direction when feeding through feeder equipment (i.e., the splice does not to be aligned axially). The cuts can consist of offset cuts in the adhesive coated film and the protective liner with additional perforations in the adhesive coated film and protective paper. The cuts facilitate removal of the protective paper from the splicing sections of the adhesive-coated films during the application process. Further, the cuts prevent premature detachment of the sections during the splicing application. The cuts and perforations pattern create a single cut or perforated line to facilitate a fold line in the adhesive coated film and protective paper about which the invention can be folded easily. The cuts provide continuity of the adhesive coated film and protective paper sections during application of the invention, yet arranged so as to be easily detachable from the adhesive coated film sections which make up the splicing sections for the top and bottom side of the spliced roll joint.

Based on the foregoing, it can be appreciated that a number of advantages can result from implementation of the disclosed apparatus. An apparatus is herein disclosed. In an embodiment, the apparatus comprises: a tape material having a first surface and a second surface; a protective paper covering an adhesive composition on the second surface of the tape material; and a staggered section formation of the first surface of the tape material and the protective paper covering the adhesive composition on the second surface of the tape material, wherein the staggered section formation comprises the tape material divided into a first section, a second section, and a third section, and the protective paper divided into a fourth section, a fifth section, and a sixth section, wherein the first section overlaps the fourth section and the fifth section, and wherein the third section overlaps the fifth section and the sixth section.

In another embodiment, the apparatus comprises a stiffening strip attached to the first section of the tape material, wherein the stiffening strip comprises an inductive sensing strip or a visual sensing strip. In an embodiment, the stiffening strip comprises a metallic material, wherein the metallic material comprises at least one of the following: brass, copper, or bronze. In another embodiment, the tape material comprises a flexible plastic material, wherein the plastic material comprises polyester. One embodiment comprises at least one notch on a lateral edge of the tape material and at least one notch on a lateral edge of the protective paper. In yet other embodiments, the apparatus further comprises at least one alignment hole in the tape material.

In another embodiment, the apparatus further comprises a polymer material adhered to the first surface of the tape material, wherein the polymer material comprises polyester. In other embodiments, the tape material comprises a plurality of laterally-aligned tape sections, wherein the plurality of the laterally-aligned tape sections are divided with a perforation, and wherein a notch is included in the tape material and the protective paper between each laterally-aligned tape section. In other embodiments, the apparatus comprises a horizontal line cut across the tape material, wherein the horizontal line comprises an offset cut in the tape material and an offset cut in the protective paper. In an embodiment, the apparatus further comprises a first perforation between the first section and the second section, a second perforation between the second section and the third section, a third perforation between the fourth section and the fifth section, and a fourth perforation between the fifth section and the sixth section. In another embodiment, the apparatus comprises a fold line bisecting the second section.

Another apparatus is herein disclosed. This apparatus comprises: a tape material having a first surface and a second surface; a protective paper covering an adhesive composition on the second surface of the tape material; at least one alignment hole in the tape material; and a staggered section formation of the first surface of the tape material and the protective paper covering the adhesive composition on the second surface of the tape material, wherein the staggered section formation comprises the tape material divided into a first section, a second section, and a third section, and the protective paper divided into a fourth section, a fifth section, and a sixth section, wherein the first section overlaps the fourth section and the fifth section, and wherein the third section overlaps the fifth section and the sixth section, and wherein a fold line bisects the second section.

In an embodiment, the apparatus comprises a stiffening strip attached to the first section of the tape material, wherein the stiffening strip comprises an inductive sensing strip or a visual sensing strip, wherein the stiffening strip comprises a metallic material, wherein the metallic material comprises at least one of the following: brass, copper, or bronze. In other embodiments, the tape material comprises a flexible plastic material, wherein the plastic material comprises polyester. In another embodiment, the apparatus further comprises at least one notch on a lateral edge of the tape material and at least one notch on a lateral edge of the protective paper. In yet other embodiments, the apparatus comprises a horizontal line cut across the tape material, wherein the horizontal line comprises an offset cut in the tape material and an offset cut in the protective paper. In another embodiment, the apparatus comprises a first perforation between the first section and the second section, a second perforation between the second section and the third section, a third perforation between the fourth section and the fifth section, and a fourth perforation between the fifth section and the sixth section.

Yet another apparatus is disclosed herein. This apparatus comprises: a tape material having a first surface and a second surface; a protective paper covering an adhesive composition on the second surface of the tape material; at least one alignment hole in the tape material; a staggered section formation of the first surface of the tape material and the protective paper covering the adhesive composition on the second surface of the tape material, wherein the staggered section formation comprises the tape material divided into a first section, a second section, and a third section, and the protective paper divided into a fourth section, a fifth section, and a sixth section, wherein the first section overlaps the fourth section and the fifth section, and wherein the third section overlaps the fifth section and the sixth section, and wherein a fold line bisects the second section; and a stiffening strip attached to the first section of the tape material, wherein the stiffening strip comprises an inductive sensing strip or a visual sensing strip, wherein the stiffening strip comprises a metallic material, wherein the metallic material comprises at least one of the following: brass, copper, or bronze.

In an embodiment, the apparatus comprises: at least one notch on a lateral edge of the tape material and at least one notch on a lateral edge of the protective paper; a horizontal line cut across the tape material, wherein the horizontal line comprises an offset cut in the tape material and an offset cut in the protective paper. In another embodiment, the apparatus comprises a first perforation between the first section and the second section, a second perforation between the second section and the third section, a third perforation between the fourth section and the fifth section, and a fourth perforation between the fifth section and the sixth section.

It will be appreciated that variations of the above-disclosed and other features and functions, or alternatives thereof, may be desirably combined into many other different systems or applications. Furthermore, various presently unforeseen or unanticipated alternatives, modifications, variations or improvements therein may be subsequently made by those skilled in the art, which are also intended to be encompassed by the following claims.

What is claimed is:

1. An apparatus, comprising:
a single unit of splice tape material having a first surface and a second surface;
a protective paper covering an adhesive composition on said second surface of said single unit of splice tape material;
a staggered slit arrangement of said single unit of splice tape material and said protective, wherein said plurality of staggered sections of said single unit of splice tape material further comprise a first tape section, a second tape section and a third tape section, and said staggered sections of said protective paper comprise a protective paper of a first section, a protective paper of a second section, and a protective paper of a third section: wherein said protective paper of said second section overlaps said first tape section and said third tape section: and wherein said second tape section comprises a fold line bisecting said single unit of splice tape, and said protective paper of said second section is not removed from said second tape section of said single unit of splice tape; and
a plurality of alignment guides.

2. The apparatus of claim 1 further comprising a stiffening strip attached to said single unit of splice tape material, wherein said stiffening strip comprises an inductive sensing strip or a visual sensing strip.

3. The apparatus of claim 2 wherein said stiffening strip comprises a metallic material, wherein said metallic material comprises at least one of the following: brass, copper, or bronze.

4. The apparatus of claim 3 wherein said single unit of splice tape material comprises a flexible plastic material, wherein said plastic material comprises polyester.

5. The apparatus of claim 4 further comprising at least one notch on a lateral edge of said single unit of splice tape material and at least one notch on a lateral edge of said protective paper.

6. The apparatus of claim 1 wherein said alignment guide comprises at least one of:
at least one alignment hole;
at least one alignment notch; and
at least one alignment indention.

7. The apparatus of claim 1 further comprising a polymer material adhered to said first surface of said single unit of splice tape material, wherein said polymer material comprises polyester.

8. The apparatus of claim 1 further comprising a horizontal line cut across said single unit of splice tape material, wherein said horizontal line comprises an offset cut in said single unit of splice tape material and an offset cut in said protective paper.

9. An apparatus, comprising:
a single unit of splice tape material having a first surface and a second surface;
a protective paper covering an adhesive composition on said second surface of said tape material;
at least one alignment guide in said tape material; and
a staggered slit arrangement of said single unit of splice tape material and said protective, wherein said plurality of staggered sections of said single unit of splice tape material further comprise a first tape section, a second tape section and a third tape section, and said staggered sections of said protective paper comprise a protective paper of a first section, a protective paper of a second section, and a protective paper of a third section; wherein said protective paper of said second section overlaps said first tape section and said third tape section; and wherein said second tape section comprises a fold line bisecting said single unit of splice tape, and said protective paper of said second section is not removed from said second tape section of said single unit of splice tape.

10. The apparatus of claim 9 further comprising a stiffening strip attached to, said single unit of splice tape material, wherein said stiffening strip comprises an inductive sensing strip or a visual sensing strip, wherein said stiffening strip comprises a metallic material, wherein said metallic material comprises at least one of the following: brass, copper, or bronze.

11. The apparatus of claim 9 wherein said single unit of splice tape material comprises a flexible plastic material, wherein said plastic material comprises polyester.

12. The apparatus of claim 9 further comprising at least one notch on a lateral edge of said single unit of splice tape material and at least one notch on a lateral edge of said protective paper.

13. The apparatus of claim 9 further comprising a horizontal line cut across said single unit of splice tape material, wherein said horizontal line comprises an offset cut in said tape material and an offset cut in said protective paper.

14. The apparatus of claim 9 wherein said at least one alignment guide comprises at least one of:
at least one alignment hole;
at least one alignment notch; and
at least one alignment indention.

15. An apparatus, comprising:
a single unit of splice tape material having a first surface and a second surface;
a protective paper covering an adhesive composition on said second surface of said single unit of splice tape material;
at least one alignment guide in said single unit of splice tape material;
a staggered slit arrangement of said single unit of splice tape material and said protective, wherein said plurality of staggered sections of said single unit of splice tape material further comprise a first tape section, a second tape section and a third tape section, and said staggered sections of said protective paper comprise a protective paper of a first section, a protective paper of a second section, and a protective paper of a third section; wherein said protective paper of said second section overlaps said first tape section and said third tape section; and wherein said second tape section comprises a fold line bisecting said single unit of splice tape, and said protective paper of said second section is not removed from said second tape section of said single unit of splice tape; and
a stiffening strip attached to said first section of said single unit of splice tape material, wherein said stiffening strip comprises an inductive sensing strip or a visual sensing strip, wherein said stiffening strip comprises a metallic material, wherein said metallic material comprises at least one of the following: brass, copper, or bronze.

16. The apparatus of claim 15 further comprising:
at least one notch on a lateral edge of said single unit of splice tape material and at least one notch on a lateral edge of said protective paper; and
a horizontal line cut across said single unit of splice tape material, wherein said horizontal line comprises an offset cut in said single unit of splice tape material and an offset cut in said protective paper.

17. The apparatus of claim 15 wherein said at least one alignment guide comprises at least one of;
at least one alignment hole;
at least one alignment notch; and
at least one alignment indention.

* * * * *